United States Patent

Nagano et al.

[11] Patent Number: 5,976,406
[45] Date of Patent: Nov. 2, 1999

[54] LIQUID CRYSTAL POLYESTER RESIN COMPOSITION

[75] Inventors: Satoshi Nagano, Ibaraki; Hideo Nomura, Chiba, both of Japan

[73] Assignee: Sumitomo Chemical Company, Limited, Osaka, Japan

[21] Appl. No.: 09/017,925

[22] Filed: Feb. 3, 1998

[30] Foreign Application Priority Data

Feb. 3, 1997 [JP] Japan .................................. 9-020255

[51] Int. Cl.$^6$ .............................. C09K 19/52; C08K 3/04; C08L 67/03
[52] U.S. Cl. ............................... 252/299.01; 252/299.66; 252/299.67; 252/299.5; 524/495; 524/848; 525/444
[58] Field of Search ............................ 252/299.01, 299.5, 252/299.64, 299.66, 299.67; 524/848, 495; 525/444; 439/606

[56] References Cited

U.S. PATENT DOCUMENTS

| | | | |
|---|---|---|---|
| 5,352,746 | 10/1994 | Asai et al. ............................... | 525/444 |
| 5,529,716 | 6/1996 | Normura et al. ................... | 252/299.01 |
| 5,681,888 | 10/1997 | Normura et al. ........................ | 524/496 |
| 5,804,634 | 9/1998 | Umestsu et al. ........................ | 524/466 |

*Primary Examiner*—Shean C. Wu
*Attorney, Agent, or Firm*—Birch, Stewart, Kolasch & Birch, LLP

[57] ABSTRACT

A resin composition comprising an inorganic filler in the form of fiber or plate compounded in a liquid crystal polyester resin composition obtained by compounding 10 to 150 parts by weight of a liquid crystal polyester (B) into 100 parts by weight of a liquid crystal polyester (A), wherein the liquid crystal polyester (A) has a flow temperature of from 310 to 400° C., the liquid crystal polyester (B) has a flow temperature of from 270 to 370° C., the difference between the flow temperature of the liquid crystal polyester (A) and the flow temperature of the liquid crystal polyester (B) is from 10 to 60° C., and the content of the inorganic filler is from 15 to 180 parts by weight based on 100 parts by weight of the total amount of the liquid crystal polyester (A) and the liquid crystal polyester (B).

The resin composition is excellent in thin-wall flowability and can provide a molded article having excellent heat resistance and low warpage, and can provide a super thin-wall molded article.

5 Claims, 1 Drawing Sheet

LIQUID CRYSTAL POLYESTER RESIN COMPOSITION

BACKGROUND OF THE INVENTION

1. Field of the Invention

The present invention relates to a resin composition which has excellent thin-wall flowability and provides a molded article having excellent heat resistance and low warpage.

2. Description of the Related Art

Since a liquid crystal polyester is composed of a rigid molecule, a polydomain is formed which does not cause entangling and keeps liquid crystal condition even in molten condition, there is represented a behavior in which a molecular chain is extremely oriented along flowing direction by shearing in molding, therefore, the polyester is generally called a melted liquid crystal type (thermotropic liquid crystal) polymer. The liquid crystal polyester has extremely excellent melt flowing property because of this specific behavior, and has high temperature of deflection under load and continuous use temperature depending on the molecular structure, and deformation and blister do not occur even if it is immersed in a melted solder of 260° C. or higher. Therefore, a resin composition prepared by filling a fibrous reinforcing material represented by a glass fiber and an inorganic filler represented by talc into a liquid crystal polyester, is a material suitable for electric and electronic parts in thin-wall or complicated portions, and for example, used for sealing a relay part, coil bobbin, connector, volume part, motor parts such as a commutator and separator, or elements such as a coil, quartz oscillator, IC chip and the like. However, in a recent trend of small and light articles, a product shape is further required to be thin, and the electric and electronic parts as described above are required to have further improved flowability with maintaining the conventional heat resistance and mechanical properties. For further improvement of flowability of a liquid crystal polyester, various investigations have been carried out. For example, Japanese Patent Application Laid-Open (JP-A) No. 57-40550 discloses that a blend composed of a complete aromatic polyester which forms a first anisotropic melt phase composed of a repeating unit comprising about 10 or more % by mole of naphthalene and a complete aromatic polyester which forms a second anisotropic melt phase, is a polymer blend showing anisotropic melt phase which does not manifest significant decrease in mechanical property (herein, it is well known to those skilled in the art that the complete aromatic polyester which forms an anisotropic melt phase has the same meaning as a liquid crystal polyester.). However, in this publication, there is no description at all regarding whether such a polymer blend improves flowability of the first or second complete aromatic polyester. JP-A 59-85733 discloses that extrusion molding property of a liquid crystal polyester is improved by blending small amount of a crystalline compound having low molecular weight (less than 1000) into the liquid crystal polyester. However, this publication does not describe possibility of improvement in flowability in injection-molding, and in general, such a compound having low molecular weight has low heat resistance, and therefore causes thermal decomposition in molding-processing and can not be used. JP-A 3-252457 discloses that flowability of a liquid crystal polyester is improved by adding small amount of an oligomer containing as a main component p-hydroxy benzoic acid to the liquid crystal polyester. However, this composition is not stable in heat resistance represented by solder heat resistance, and can not be used practically. JP-A 60-245632 discloses improvement in flowability by adding small amount of a polymer flowability modifier composed of terephthalic acid, p-hydroxy benzoic acid, hydroquinone, isophthalic acid and biphenyl to aromatic oxybenzoyl polyesters. However, there is neither description that this polymer flowability modifier is a liquid crystal polyester, nor description that this modifier has effect of improving flowability in injection-molding at all. Further, in the use for a connector, improvements in low warpage and heat resistance are intensively required in addition to the above-described improvement in flowability, and the above-described methods can not provide a material having flowability, low warpage and heat resistance in good proportion.

SUMMARY OF THE INVENTION

An object of the present invention is to solve the above-described problems and to provide a liquid crystal polyester resin composition which has excellent thin-wall flowability and provides a molded article having excellent heat resistance and low warpage.

The present inventors have intensively studied to solve the above-described problems and have found that there is obtained a resin composition which can accomplish the above-described object by blending specific amount of an inorganic filler in the form of fiber or plate into a liquid crystal polyester resin composition obtained by blending a liquid crystal polyester (A) and a liquid crystal polyester (B) in specific amounts wherein there is specific difference between their flow temperatures, and that there can be obtained a super thin-wall molded article having thickness of 0.2 mm or less and having excellent heat resistance and low warpage by using the composition, completing the present invention. Namely, the present inventions are as described below.

[1] A resin composition comprising an inorganic filler in the form of fiber or plate compounded in a liquid crystal polyester resin composition obtained by compounding 10 to 150 parts by weight of a liquid crystal polyester (B) into 100 parts by weight of a liquid crystal polyester (A), wherein the liquid crystal polyester (A) has a flow temperature as defined below from 310 to 400° C., the liquid crystal polyester (B) has a flow temperature as defined below from 270 to 370° C., the difference between the flow temperature of the liquid crystal polyester (A) and the flow temperature of the liquid crystal polyester (B) is from 10 to 60° C., and the content of the inorganic filler is from 15 to 180 parts by weight based on 100 parts by weight of the total amount of the liquid crystal polyester (A) and the liquid crystal polyester (B). Flow temperature: a temperature at which the melt viscosity is 48000 poise when a heat-melted material is extruded through a nozzle at a temperature-rising rate of 4° C./minute under a load of 100 kg/cm$^2$ using a capillary rheometer having an inner diameter of 1 mm and a length of 10 mm.

[2] The resin composition according to [1], wherein the liquid crystal polyester (A) and the liquid crystal polyester (B) are respectively composed of the following structural units (I), (II), (III) and (IV),

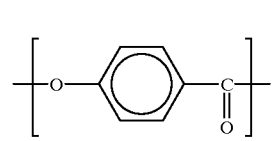

(I)

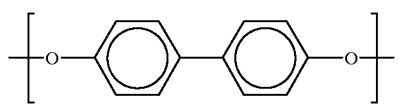

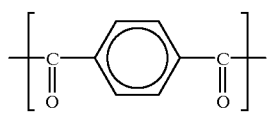

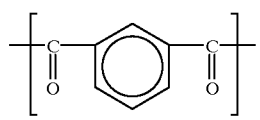

the molar ratio II/I is from 0.2 to 1.0, the molar ratio (III+IV)/II is from 0.9 to 1.1, the ratio IV/III is from 0 to 1, and the ratio of (α) the molar ratio IV/III in the liquid crystal polyester (A) to (β) the molar ratio IV/III in the liquid crystal polyester (B) is from 0.1 to 0.5.

[3] The resin composition according to [1], wherein the inorganic filler in the form of fiber or plate is at least one selected from glass fiber, carbon fiber, mica and talc.

[4] A molded article molded using the resin composition of [1], [2] or [3].

[5] The molded article according to [4], wherein the molded article is a connector.

DETAILED DESCRIPTION OF THE INVENTION

Figure 1:
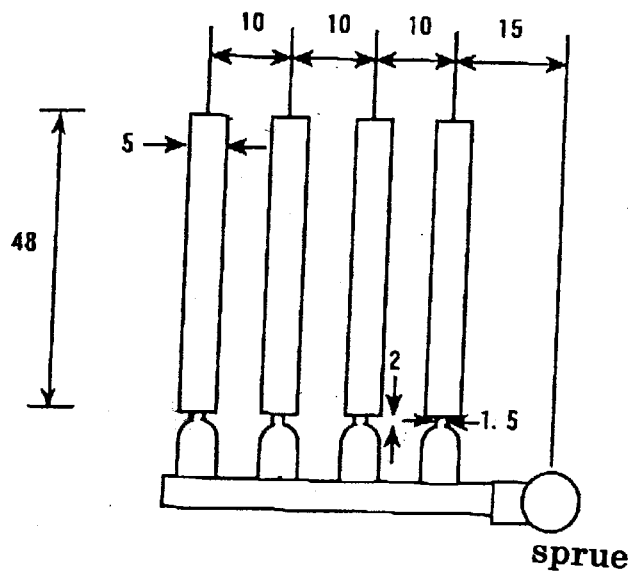
FIG. 1 is an illustration view of a thin-wall flowing length measuring mold. The product thickness is 0.2 mm, the runner diameter is 3.0 mm and the gate size is 0.2 t×1.5 w×2.01.

The liquid crystal polyester used in the present invention is composed of a liquid crystal polyester (A) having a flow temperature as defined above of 310 to 400° C. and a liquid crystal polyester (B) having a flow temperature as defined above of 270 to 370° C., and the difference between the flow temperature of the liquid crystal polyester (A) and the flow temperature of the liquid crystal polyester (B) is from 10 to 60° C., preferably from 20 to 60° C. When the difference in the flow temperatures is lower than 10° C., the intended effect for improving thin-wall flowability is insufficient. On the other hand, when the difference in the flow temperatures is over 60° C., molding process is difficult because of thermal decomposition of the liquid crystal polyester and the like and an excellent molded article can not be obtained. It is preferable the liquid crystal polyester (A) and the liquid crystal polyester (B) are respectively composed of the above-described structural units (I), (II), (III) and (IV), and the molar ratio II/I is from 0.2 to 1.0, the molar ratio (III+IV)/II is from 0.9 to 1.1, the molar ratio IV/III is from 0 to 1. These liquid crystal polyesters are described in Japanese Patent Application Publication (JP-B) No. 47-47870. Further, the ratio of (α) the molar ratio IV/III in the liquid crystal polyester (A) to (β) the molar ratio IV/III in the liquid crystal polyester (B) is preferably from 0.1 to 0.5, more preferably from 0.3 to 0.5.

Regarding the compounding ratio of the liquid crystal polyester (A) and the liquid crystal polyester (B), the liquid crystal polyester (B) is compound in an amount from 10 to 150 parts by weight, preferably from 10 to 100 parts by weight based on 100 parts by weight of the liquid crystal polyester (A). When the compounding amount of the liquid crystal polyester (B) is less than 10 parts by weight, the intended effect for improving thin-wall flowability is insufficient. On the other hand, when the compounding amount of the liquid crystal polyester (B) is over 150 parts by weight, though thin-wall flowability is improved, decrease in heat resistance is large and mechanical strength also decreases.

The inorganic filler in the form of fiber used in the present invention has an average fiber diameter of preferably from 5 to 20 μm, more preferably from 5 to 15 μm. When the average fiber diameter is less than 5 μm, the intended effects for improving flowability, low warpage, and heat resistance are insufficient. On the other hand, when the average fiber diameter is over 20 μm, the effects for improving flowability, low warpage, and heat resistance are not so different from those when the average fiber diameter is 20 μm or less, however, appearance of a molded article and uniform dispersibility in a molded article are not preferable. The average fiber length is preferably from 10 to 300 μm, and more preferably from 50 to 300 μm. When the average fiber length is less than 10 μm, the intended effects for improving flow ability, low warpage, and heat resistance are insufficient. On the other hand, when the average fiber length is over 300 μm, the effect for improving flowability is poor, and appearance of a molded article and uniform dispersibility in a molded article are not preferable. Examples thereof include, but are limited to, glass fiber, silica alumina fiber, alumina fiber, carbon fiber and the like.

The inorganic filler in the form of a plate used in the present invention has a crystal structure in the form of a plane layer by chemical bond, and since the layers are bonded by weak van der Waals force, cleavage easily occurs and a particle in the form a plate is produced in grinding. The average particle size of the inorganic filler in the form of a plate used in the present invention is from 1 to 20 μm, preferably from 5 to 20 μm. Examples thereof include, but are not limited to, talc, mica, graphite and the like. When the average particle size is not more than 1 μm, the intended effects for improving flowability, low warpage, and heat resistance are insufficient. On the other hand, when the average particle size is over 20 μm, the effects for improving flowability, low warpage, and heat resistance are not so different from those when the average fiber diameter is not more than 20 μm, however, appearance of a molded article and uniform dispersibility in a molded article are not preferable. Among them, glass fiber, carbon fiber and talc are preferred. These may be used alone or in combination.

In the liquid crystal polyester resin composition of the present invention, the content of the inorganic filler in the form of fiber or plate is from 15 to 180 parts by weight, preferably from 20 to 150 parts by weight based on 100 parts by weight of the total amount of the liquid crystal polyester (A) and the liquid crystal polyester (B). When the content of the inorganic filler in the form of fiber or plate is less than 15 parts by weight, though thin-wall flowability is improved, the effects for improving low warpage and heat resistance are insufficient. On the other hand, when the content of the inorganic filler in the form of fiber or plate is over 180 parts by weight, the effect for improving thin-wall flowability is insufficient, and abrasions of a cylinder and mold of a molding machine increase. One or more conventional additives such as a reinforcing material in the form of a needle such as aluminum borate whisker and the like; an inorganic filler such as glass bead and the like; a releasing improving agent such as a metal soap and the like; a coloring agent such as a dye, pigment and the like; an antioxidant; a heat stabilizer; a ultraviolet ray absorber; an antistatic agent; a surfactant; and the like, can be added to the liquid crystal polyester resin composition used in the present invention, in a range which does not disturb the object of the present invention. Further, one or more materials having external lubricating effect such as a higher fatty acid, higher fatty ester, higher fatty metal salt, fluorocarbon-based surfactant and the like, can also be added.

Further, one or more of a small amount of a thermoplastic resin, such as a polyamide, polyester, polyphenylene sulfide, polyether ketone, polycarbonate, polyphenylene ether and modified material thereof, and a small amount of a thermosetting resin, such as a phenol resin, epoxy resin, polyimide resin and the like, can also be added.

The means for compounding raw material components to obtain the liquid crystal polyester resin composition of the present invention is not particularly restricted. The liquid crystal polyester (A), the liquid crystal polyester (B), the inorganic filler in the form of fiber or plate, and optionally, a reinforcing agent and inorganic filler such as aluminum borate whisker and the like, a releasing improving agent, a heat stabilizing agent and the like may be respectively separately supplied to a melt mixer, or these raw material components may also be premixed using a mortar, Henschell mixer, ball mill, ribbon blender and the like before supplying to a melt mixer. Further, the liquid crystal polyester (A) and the inorganic filler in the form of fiber or plate, and the liquid crystal polyester (B) and the inorganic filler in the form of fiber or plate can also be separately supplied to a melt mixer to form pellets before they are mixed in the form of a pellet to obtain a given formulation. The liquid crystal polyester resin composition of the present invention is suitably used for electric and electronic parts (switch, relay, connector, socket and the like), sealing of electric and electronic parts and elements such as a light emitting diode, IC and the like, OA and AV appliances (cases and mechanism parts of a printer, copying machine, facsimile, video deck, video camera, floppy disk drive, hard disc drive, CD-ROM drive, light magnetic disc drive and the like), and other mechanism parts (still camera, heat cooking machine using an electromagnetic wave, automobile parts).

EXAMPLE

Examples of the present invention are shown below, however, the present invention is not limited to them. Physical properties in the examples were measured according to the following methods.

(1) Tensile strength was measured according to ASTM D638 using a ASTM no.4 tensile dumbbell.

(2) Flexural modulus was measured according to ASTM D790 using a rod specimen having a width of 12.7 mm, a length of 127 mm and a thickness of 6.4 mm.

(3) TDUL (temperature of deflection under load) was measured according to ASTM D648 under a load of 18.6 kg/cm$^2$, at a temperature rising rate of 2° C./min using a rod specimen having a width of 6.4 mm, a length of 127 mm and a thickness of 12.7 mm.

(4) Solder heat resistance: A dumbbell specimen (thickness 1.2 mm) according to JIS K7113 (1/2) was immersed in a solder bath heated to given temperature for 60 seconds, then the specimen was took out and changes in outward appearance such as blister or deformation were observed by eyes. The test was conducted with raising the temperature of the solder bath step by step by 5° C., and the temperature 5° C. lower than a temperature at which change occurred on outward appearance was determined as a solder heat resistance temperature.

(5) Thin-wall flowability: A thin-wall flowing length measuring mold shown in FIG. 1 having a product thickness of 0.2 mm and 4 cavities was used, and a sample was molded (injection speed 95%, injection pressure 900 kg/cm$^2$) at given measuring temperature using a injection molding machine (PS10E1ASE model manufactured by Nisssei Plastic Industrial Corp.). Lengths of 4 cavities of a molded article were measured, and the average value thereof was calculated as a thin-wall flowing length.

Figure 2:
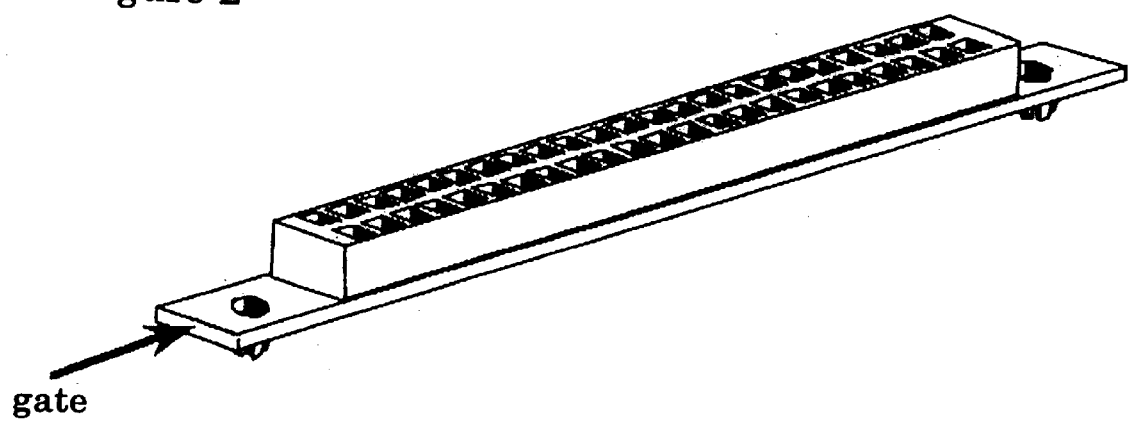
FIG. 2 is a perspective view of a mold for a connector.

(6) Warpage: A sample was molded by a injection molding machine (PS40E5ASE model manufactured by Nisssei Plastic Industrial Corp.) using a connector mold shown in FIG. 2 (thickness in terminal 0.15 mm). The molded article was placed on a supporting substrate, displacement of the bottom surface opposite to gate was measured by micrometer using the gate side bottom position as a base surface. The average value of 5 molded articles was calculated as a warpage value.

Examples 1 to 3

LCP1 having a flow temperature as defined by the above-described method of 320° C. in which molar ratio of p-hydroxybenzoic acid:4,4'-dihydroxydiphenyl:terephthalic acid:isophthalic acid is 60:20:15:5 was used as the liquid crystal polyester (A) and LCP2 having a flow temperature as defined by the above-described method of 280° C. in which molar ratio of p-hydroxybenzoic acid:4,4'-dihydroxydiphenyl:terephthalic acid:isophthalic acid is 60:20:10:10 was used as the liquid crystal polyester (B), and these polyesters and glass fiber (trade name: CS03JAPx-1, manufactured by Asahi Fiber Glass Corp.) were mixed by Henschel mixer at a formulation shown in Table 1, the mixture was granulated using a biaxial extruder (PCM-30 model manufactured by Ikegai Iron Works LTD.) at a cylinder temperature of 330° C. In this case, the difference between the liquid crystal polyester (A) and the liquid crystal polyester (B) was 40° C. These resin compositions were dried at 120° C. for 3 hours, then, a ASTM no.4 tensile dumbbell, a rod specimen, a JIS K7113 (1/2) specimen and a connector were molded using a injection molding machine (PS40E5ASE model manufactured by Nisssei Plastic Industrial Corp.) at a cylinder temperature of 350° C. The tensile strength, flexural modulus, TDUL, solder heat resistance and warpage value were measured using these specimens. Further, the thin-wall flowability was measured according to the above-described method at a cylinder temperature of 350° C. and a mold temperature of 130° C. The results are shown in Table 1.

Comparative Examples 1 and 2

The same measurements were conducted on a resin composition containing no LCP2 (comparative example 1) and a resin composition in which the content of LCP2 was 233 parts by weight (comparative example 2) according to the same manners. The results are shown in Table 1. It is known that the composition containing LCP2 (examples 1 to 3) has more excellent thin-wall flowability as compared with the composition containing no LCP2 (comparative example 1), and has the same excellent heat resistance and low warpage as those of the composition containing no LCP2. In the composition containing no LCP2 (comparative example 1), short-shot was observed in a part of a thin-wall part of the connector, and flowability was insufficient. Further, in the liquid crystal polyester resin composition containing 233 parts by weight of LCP2, decrease in mechanical physical property and decrease in heat resistance were large.

Comparative Example 3

The same test was conducted in the same manner as in Example 1 except that no glass fiber was added to LCP1 and LCP2. The results are shown in Table 1. When no glass fiber was added, warpage value was large and the molded article could not used.

Comparative Example 4

The same test was conducted in the same manner as in Example 1 except that LCP3 having a flow temperature as defined by the above-described method of 360° C. in which molar ratio of p-hydroxybenzoic acid:4,4'-dihydroxydiphenyl:terephthalic acid:isophthalic acid is 60:20:18:2 was used as the liquid crystal polyester (A) and LCP2 was used as the liquid crystal polyester (B). The results are shown in Table 1. In this case, the difference between the liquid crystal polyester (A) and the liquid crystal polyester (B) was 80° C. In this case, at 350° C., the composition did not flow sufficiently in the mold, and at 370° C., molding was impossible because of thermal decomposition of the composition.

Examples 4 to 5

The same tests were conducted in the same manner as in Example 1 except that glass fiber and talc (trade name: X-50, manufactured by Nippon Talc Corp.) were added to LCP1 and LCP2. The results are shown in Table 1. It is known that the resin composition composed of LCP1, LCP2, glass fiber and talc is excellent in thin-wall flowability and has excellent heating resistance and low warpage.

Examples 6 to 8 and Comparative Example 5

The same tests were conducted in the same manner as in Example 1 except that LCP3 was used as the liquid crystal polyester (A), LCP1 was used as the liquid crystal polyester (B) and the molding temperature was 370° C. The results are shown in Table 1. In this case, the difference between the liquid crystal polyester (A) and the liquid crystal polyester (B) was 40° C. It is known that the resin composition composed of LCP3, LCP1 and glass fiber is excellent in thin-wall flowability as compared with the liquid crystal polyester resin composition composed only of LCP3 and glass fiber (comparative example 6) and has the same excellent mechanical physical property and heating resistance as those of the composition containing no LCP1.

TABLE 1

| | Liquid crystal polyester (A) | | Liquid crystal polyester (B) | | Filler | |
|---|---|---|---|---|---|---|
| | | parts by weight | | parts by weight | | parts by weight |
| Example 1 | (LCP 1) | 100 | (LCP 2) | 11 | GF | 48 |
| Example 2 | (LCP 1) | 100 | (LCP 2) | 43 | GF | 61 |
| Example 3 | (LCP 1) | 100 | (LCP 2) | 100 | GF | 86 |
| Comparative Example 1 | (LCP 1) | 100 | | 0 | GF | 43 |
| Comparative Example 2 | (LCP 1) | 100 | (LCP 2) | 233 | GF | 143 |
| Comparative Example 3 | (LCP 1) | 100 | (LCP 2) | 43 | | 0 |
| Comparative Example 4 | (LCP 3) | 100 | (LCP 2) | 43 | GF | 61 |
| Example 4 | (LCP 1) | 100 | (LCP 2) | 50 | GF | 51 |
| | | | | | Talc | 30 |
| Example 5 | (LCP 1) | 100 | (LCP 2) | 67 | GF | 57 |
| | | | | | Talc | 33 |
| Example 6 | (LCP 3) | 100 | (LCP 1) | 11 | GF | 74 |
| Example 7 | (LCP 3) | 100 | (LCP 1) | 25 | GF | 83 |
| Comparative Example 5 | (LCP 3) | 100 | | 0 | GF | 67 |

| | Tensile strength kg/cm2 | Flexural modulus kg/cm2 | TDUL °C. | Solder heat resistance °C. | Thin-wall flowability mm | | Warpage mm |
|---|---|---|---|---|---|---|---|
| Example 1 | 1530 | 114000 | 279 | 310 | 11.9 | 350 | 0.21 |
| Example 2 | 1530 | 116000 | 272 | 305 | 13.4 | 350 | 0.17 |
| Example 3 | 1510 | 115000 | 266 | 300 | 23.3 | 350 | 0.15 |
| Comparative Example 1 | 1490 | 115000 | 285 | 315 | 9.7 | 350 | 0.26 short-shot |
| Comparative Example 2 | 1270 | 115000 | 223 | 290 | 33.1 | 350 | 0.11 |
| Comparative Example 3 | 1610 | 40000 | 228 | 300 | 21.5 | 350 | 1.29 |
| Comparative Example 4 | * | * | * | * | * | * | * |
| Example 4 | 1420 | 101000 | 273 | 305 | 33.5 | 350 | 0.12 |
| Example 5 | 1430 | 116000 | 274 | 300 | 25.1 | 350 | 0.11 |
| Example 6 | 1460 | 132000 | 328 | 335 | 10.2 | 370 | 0.19 |
| Example 7 | 1440 | 129000 | 323 | 330 | 14.3 | 370 | 0.17 |
| Comparative Example 5 | 1460 | 143000 | 332 | 335 | 8.2 | 370 | 0.22 short-shot |

*: Specimen could not be obtained.

The resin composition of the present invention is excellect in thin-wall flowability and can provide a molded article having excellent heat resistance and low warpage, and can provide a super thin-wall molded article having thin-wall part of 0.2 mm or less, among other, a connector, more easily than conventional methods.

What is claimed is:

1. A resin composition comprising an inorganic filler in the form of fiber or plate compounded in a liquid crystal polyester resin composition obtained by compounding 10 to 150 parts by weight of a liquid crystal polyester (B) into 100 parts by weight of a liquid crystal polyester (A), wherein the liquid crystal polyester (A) has a flow temperature from 310 to 400° C., the liquid crystal polyester (B) has a flow temperature from 270 to 370° C., the difference between the flow temperature of the liquid crystal polyester (A) and the flow temperature of the liquid crystal polyester (B) is from 10 to 60° C., the content of the inorganic filler is from 15 to 180 parts by weight based on 100 parts by weight of the total amount of the liquid crystal polyester (A) and the liquid crystal polyester (B), the liquid crystal polyester (A) and the liquid crystal polyester (B) are respectively composed of the following structural units (I), (II), (III) and (IV),

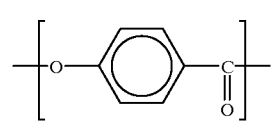

(I)

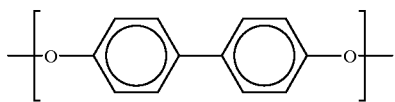
(II)

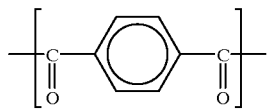
(III)

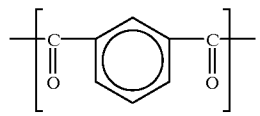
(IV)

wherein the molar ratio II/I is from 0.2 to 1.0, the molar ratio (III+IV)/II is from 0.9 to 1.1, the molar ratio IV/III is from 0 to 1, and the ratio of (α) the molar ratio IV/III in the liquid crystal polyester (A) to (β) the molar ratio IV/III in the liquid crystal polyester (B) is from 0.1 to 0.5, and wherein the flow temperature is a temperature at which the melt viscosity is 48000 poise when a heat-melted material is extruded through a nozzle at a temperature-rising rate of 4° C./minute under a load of 100 kg/cm$^2$ using a capillary rheometer having an inner diameter of 1 mm and a length of 10 mm.

2. The resin composition according to claim 1, wherein the inorganic filler in the form of fiber or plate is at least one selected from glass fiber, carbon fiber, mica and talc.

3. A molded article molded by using the resin composition of claim 1 or 2.

4. The molded article according to claim 3, wherein the molded article is a connector.

5. The resin composition according to claim 1, wherein the inorganic filler in the form of a fiber has an average fiber diameter of from 5 to 20 μm and the inorganic filler in the form of a plate has an average particle size of from 1 to 20 μm.

* * * * *